(12) United States Patent
Schlifstein et al.

(10) Patent No.: US 7,831,501 B2
(45) Date of Patent: Nov. 9, 2010

(54) HIDDEN BOOK TRADING SYSTEM

(75) Inventors: Craig Schlifstein, Delray Beach, FL (US); Evan David, Delray Beach, FL (US)

(73) Assignee: Boulder Capital Trading, Delray Beach, FL (US)

( * ) Notice: Subject to any disclaimer, the term of this patent is extended or adjusted under 35 U.S.C. 154(b) by 550 days.

(21) Appl. No.: 11/347,813

(22) Filed: Feb. 3, 2006

(65) Prior Publication Data

US 2007/0038548 A1    Feb. 15, 2007

Related U.S. Application Data

(60) Provisional application No. 60/707,607, filed on Aug. 12, 2005.

(51) Int. Cl.
*G06Q 40/00* (2006.01)
(52) U.S. Cl. .......................... 705/37; 705/35
(58) Field of Classification Search .............. 705/35–45
See application file for complete search history.

(56) References Cited

U.S. PATENT DOCUMENTS

| | | | |
|---|---|---|---|
| 5,101,353 A * | 3/1992 | Lupien et al. | 705/37 |
| 5,689,652 A | 11/1997 | Lupien | |
| 6,421,653 B1 | 7/2002 | May | |
| 7,035,819 B1 | 4/2006 | Gianakouros et al. | |
| 2001/0042040 A1* | 11/2001 | Keith | 705/37 |
| 2002/0133449 A1 | 9/2002 | Segal et al. | |
| 2003/0004859 A1 | 1/2003 | Shaw et al. | |
| 2003/0093343 A1 | 5/2003 | Huttenlocher et al. | |
| 2004/0024681 A1* | 2/2004 | Moore et al. | 705/37 |
| 2004/0059666 A1 | 3/2004 | Waelbroeck et al. | |

* cited by examiner

*Primary Examiner*—Rajesh Khattar
(74) *Attorney, Agent, or Firm*—Leason Ellis LLP (57) ABSTRACT

Presented is a system and method for performing crossing of institutional security orders. The system includes a first server interconnected to a second server and client stations across a communication network. The first server includes a database and is configured to receive institutional orders from the client station, which are stored in the database. The first server includes operating instructions operable to determine whether a match exists between contra institutional orders based on predetermined criteria. Upon determination of a match, the first server forwards a child order composed of at least a portion of one of the contra orders to the second server. At a fraction of a second later, the first server forwards the other of the contra orders to the second server followed by the remaining portion of the contra order.

13 Claims, 4 Drawing Sheets

LIVE ORDER in SYTEM

PASSIVE ORDER in SYSTEM

LIVE CONTRA ORDER

SUPER CONTRA ORDER

HIDDEN BOOK TRADING SYSTEM

CLAIM OF PRIORITY

This application claims the benefit of priority, under 35 U.S.C. §119(e), of U.S. Provisional Application No. 60/707,607, filed Aug. 12, 2005, and titled "Hidden Book Trading System," which is hereby incorporated by reference in its entirety.

FIELD OF INVENTION

The present invention relates to a multi-tier client-server software system, and more particularly to a real-time order-matching system for the execution of security investment orders on behalf of institutional investors, useful, for example, in the execution of institutional orders in compliance with Regulation NMS (that is order handling rules promulgated by the Securities and Exchange Commission).

BACKGROUND OF THE INVENTION

The majority of investment order executions that take place in equity markets are via electronic systems known as Electronic Communication Networks (ECNs). The ECNs allow the entry of any sized order (usually in lots of 100 shares), and are open to all market participants through a sponsored broker. In addition, ECNs maintain order books which contain all of the orders available on their system (price and amount available) and can be required by regulatory agencies—as is the case in the U.S. through the Security Exchange Commission (SEC)—to display to the general investing public certain ones of the best priced orders available on their systems.

Institutional traders handle the execution of orders on behalf of professional investors such as money managers, hedge funds, pension funds, and other investment professionals. The orders executed by these institutions are typically larger, sometimes vastly larger, than those executed on behalf of individual investors. Exposing these large orders to the general marketplace prior to order fulfillment can have an adverse effect on short-term marketplace stability.

Regulation NMS includes new substantive rules directed to three particular areas, Order Protection, Access, and Sub-Penny Display. The Order Protection Rule requires trading centers to create procedures designed to prevent the execution of trades at prices inferior to protected quotations displayed by other trading centers (i.e., a quote which is immediately and automatically accessible). The Access Rule requires fair and non-discriminatory access to quotations so as to harmonize the pricing of quotations across different trading centers, and requires exchanges to prohibit members from engaging in displaying quotations that lock, or cross, automated quotations. The Sub-Penny Rule prohibits market participants from displaying orders in pricing increments smaller than a penny for orders on shares priced greater than $1.00 per share.

What is needed in the art is a system that enables institutional traders to interact and negotiate on institutional orders directly with each other in a secure environment that is protected from non-institutional investors and/or traders who would capitalize on information related to institutional orders. Further needed is a system that permits anonymous interaction of institutional orders on the system that enables users to effectively interact with ECNs in a manner that minimizes their effect on a particular securities price in the general marketplace while complying with Regulation NMS. The present invention can satisfy one or more of these and other needs.

SUMMARY OF THE INVENTION

The present invention relates, in part, to crossing institutional security orders. In accordance with one aspect of the invention, a system includes a first server interconnected to a second server (e.g., ECNs, electronic markets, etc.) and client stations across a communication network. The first server includes a database and is configured to receive institutional orders from the client station, which are stored in the database. The first server includes operating instructions operable to determine whether a match exists between contra institutional orders based on predetermined criteria. Upon determination of a match, the first server forwards a child order composed of at least a portion of one of the contra orders to the second server. At, say, a fraction of a second later, the first server forwards the other of the contra orders to the second server followed by the remaining portion of the first contra order.

In accordance with another aspect of the invention, a real-time anonymous negotiation is conducted between individual trading partners. The negotiation includes a negotiation ticket sent across the communication network containing a subset of predetermined value fields. Upon acceptance of the negotiation ticket, the institutional orders are updated.

These and other aspects, features, steps and advantages can be further appreciated from the accompanying figures and description of certain illustrative embodiments.

DETAILED DESCRIPTION OF THE ILLUSTRATIVE EMBODIMENTS

Figure 1:
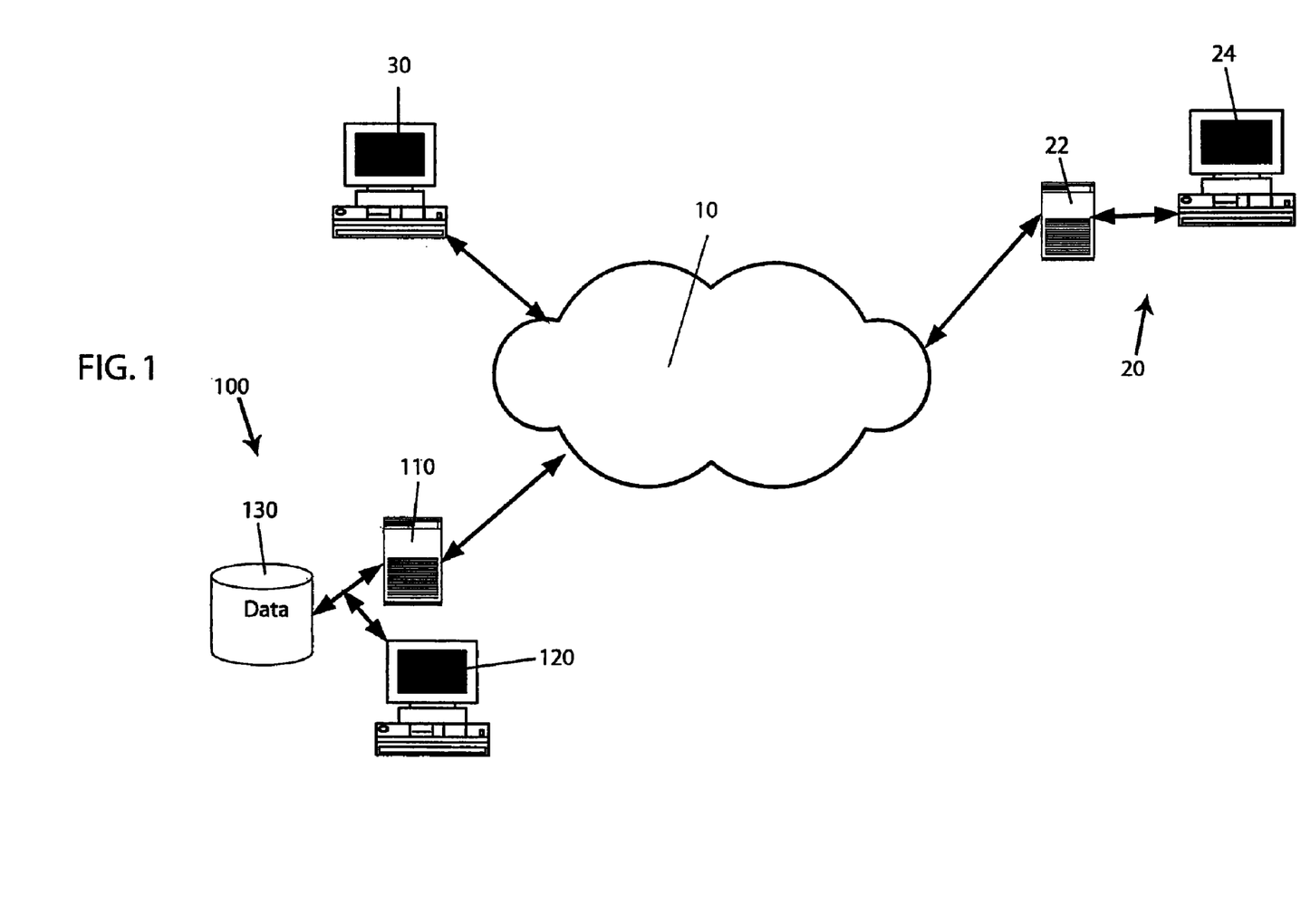
FIG. 1 is a system overview of the present invention in accordance with an illustrated embodiment thereof.

By way of overview and introduction, presented and described are embodiments of a real-time order-matching crossing system designed for use by institutional traders. FIG. 1 depicts an overview of the hardware components associated with an illustrated embodiment of the hidden-book crossing system 100. A host computer server 110 interfaces the system 100 with a distributed computer network system 10. The distributed computer network system 10 can be any type of inter-computer communication system that connects computers in a distributed manner. Examples include, but are not limited to, the Internet, an intranet, LAN, or WAN. User terminals 30 are connected via the computer network 10 to the system 100. The system 100 is also in communication with at least one ECN 20 through the communication network 10. The ECN 20 contains an away server 22 and a user terminal 24. The system 100 contains a secure server 110, a database 130, and a user terminal 120. Server 110 is controlled by a system control program (not shown) which operates to create the hidden book system of the present invention by storing, displaying, modifying, transmitting, and securing the data pertaining to market orders necessary in the series of transactions needed to accomplish the institutional trading.

Institutional traders use either the system 100 client program or a client Application Program Interface, API ("Client") provided at user terminals 30 to connect to the system 100 secure server 110 ("Server"). The Server 110 is capable of maintaining electronic communication with many Clients simultaneously. In order to participate in System 100 as a trader Clients enter into a valid trading session with the Server 110. Those Clients that wish to receive a dedicated market data stream create a individual data sessions with the Server 110. For security purposes, both types of sessions (trader or market data stream) preferably require completing an authentication sequence as is known in the art.

Database 130 can be a persistent database that is an integral part of the Server 110. Within database 130 are stored registered clients' credentials and business rules. The Server 110 creates event logs within database 130. The event logs contain order entries, user log in activity, execution results, order generation, messages from/to exchanges, etc. The event logs are used to assure that a complete as possible depository of all system activities is maintained for audit purposes. The event logs can be used in case of a system crash to recreate the state of the system prior to crashing. The Server also maintains a synchronized copy of a portion of the Database, where current state of all outstanding trade orders is recorded, in its memory. Essentially this in-memory database represents the book ("Book") and is utilized for fast cross searches and generating market data for dissemination to Clients. In case of system crash the Server rebuilds the in-memory Book from its persistent mirror image stored in the Database.

After a Client establishes a connection with the Server 110, system 100 initiates a login sequence using a suitable module thereof by sending a login request message to the Client. If the Server is able to successfully authenticate the credentials transmitted in the login request, the Server sends a login approval message back to the Client, and thus both parties are said to enter a secure logical connection ("Session") that remains valid until the physical connection is broken.

In System 100, Client registration records are role-based. Each Client is allowed to interact with the Server according to the set of roles associated with the Client's login. Business rules controlling permissions for each role are stored in the Database 130. An example of a role is "Liquidity Provider". Only those Clients with the Liquidity Provider role are allowed to participate in System 100 as market makers.

As a convenience for its market participants, System 100 supports the notion of a trading account ("Account"). By assigning account identifiers to all orders the Client can divide its Session into parallel sub-sessions for easier bookkeeping. The system control program is flexible in terms of its ability to use of network technologies and data transmission protocols. A single Server may be configured to maintain concurrent Sessions carried by different communication media and protocols. The most common of these are TCP/IP socket streams over private lines and the industry-standard FIX protocol.

The Book is an in-memory list of original Client-entered (master) trade orders as well as derived (child) orders. The Server maintains a persistent real-time copy of the Book in the Database for recovery purposes. The persistent copy of the Book can be used to recreate the state the Book at a selectable point in time in the past. Order entries in the Book are preferably arranged by equity symbol, as recognized by the marketplace.

Master orders are entered by Clients into the system 100. The Server uses master order entries to detect crosses and generate system 100 market data. Apart from the equity symbol every order is qualified by such common attributes as number of shares, trade side, order type (market, limit, peg), limit price when applicable, and others. In addition there are a number of System 100 specific attributes. One such system attribute allows Clients to flag master orders as active or passive.

Passive Master Orders indicate only an interest. They are never meant to be executed and get represented in the System 100 market data stream accordingly. Passive orders never cause creation of child orders. Passive orders can be upgraded to active state using a conventional cancel/replace mechanism.

Active Master Orders are intended for execution. The Server 110 searches for matches only among active master orders. A single active master order may have one or many dependent child orders. During its lifetime the number of child orders a master order has may change frequently due to fluctuating internal and external market conditions.

A child order represents a portion of an active master order sent to an away server (e.g., server 22 of an ECN 20) for execution. When the system 100 creates a child order the Server 110 subtracts the child order's liquidity from the total liquidity of the master order, so that the child portion becomes unavailable for matching for the lifetime of the child order. Thus, when a child order is sent to the ECN its liquidity exists. Unexecuted (residual) liquidity on the child order is merged back into the master order whenever the child order is canceled. No child order can ever exist without a corresponding master order being active. Cancellation of a master order forces all its child orders be canceled and their liquidity withdrawn from the away server of the ECN.

System 100 assigns a price range to each security maintained. In one embodiment the price range can be generated for all U.S. listed securities on all major U.S. equity markets including the New York Stock Exchange, The NASDAQ Stock Market, and The American Stock Exchange. Other embodiments can be used for other asset classes, e.g., currency or bond markets, as well as other types of fixed income instruments. As would be known by a person of ordinary skill in the art, the invention is not so limited as to be only applicable to the U.S. equity markets.

The price range contains a "buy order" or bid price and "sell order" or offer price. The range is calculated by subtracting a small amount from the National Best Bid and Offer (NBBO), as disseminated by approved market data vendors and adding a small amount, thus artificially widening the spread (difference between Best Bid and Best Offer Price) for the purposes of generating System 100 market data. The subtracted and added amounts can be specified as absolute or relative (percentage), and configured individually for every listed security based on such criteria as volume traded, spread and volatility measures. The "small amount" can be an increment or a decrement in the minimum amount accepted by the market. For example, an absolute "small amount" can be equal to a cent, and the relative "small amount" can be as little as 0.1% rounded to up to the nearest cent for offers, and rounded down to the nearest cent for bids.

The System 100 disseminates the generated price range to subscribed Clients as part of its market data stream. The price range also serves as basis for generating color alerts and helps protect System 100 trader participants against inadvertently entering orders that would be too aggressive.

All common and proprietary master order parameters and attributes remain confidential to the Client that entered the order. Each accepted master order (active or passive) updates the System 100 Book and causes broadcast of market data updates for the corresponding equity. Orders accepted by System 100 may generate a color alert that can be viewed by the Clients that subscribe to a market data stream. Because the color alerts never reveal an order's specific attributes, the Book is deemed to be "hidden", as Clients are not able see any order details, only the color alerts. Each time a new master order is accepted or an existing master order is modified, System 100 updates the Book and distributes the appropriate market data to Clients.

System 100 transmits real-time market data information to subscribed Clients. Clients view market data update messages for all symbols currently in the System 100 Book. In one embodiment, Clients can expand the symbol-set beyond the symbols listed by the Book. Similarly, Clients can also invoke a filter to remove certain symbols. The System 100 client program allows to conveniently organize symbols into view lists.

Figure 2:
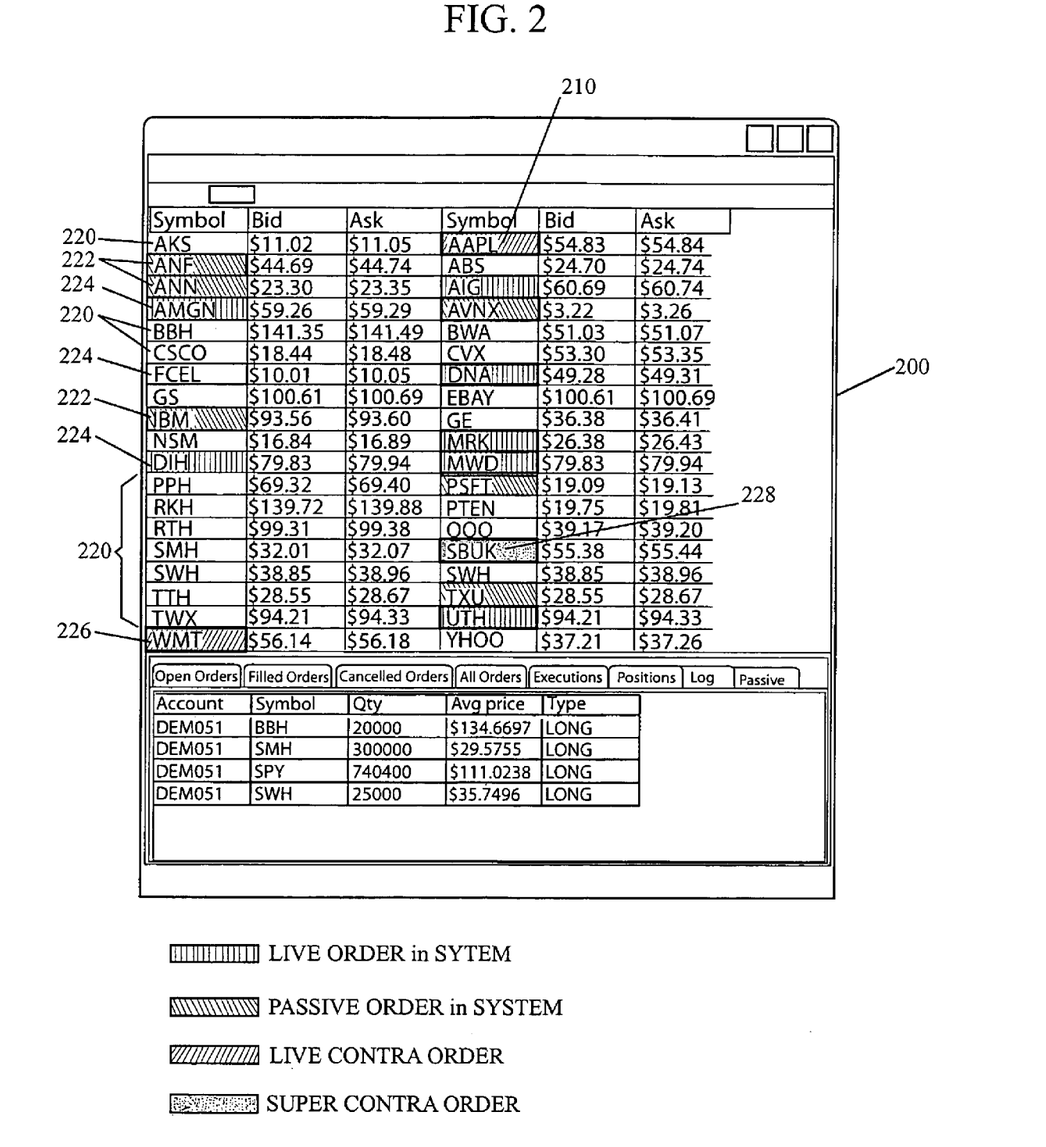
FIG. 2 is an embodiment of an exemplary GUI depicting market data messages.

The System 100 market data is unlike traditional data services that send users a list of buy/sell orders that typically contain the symbol, buy or sell, price, and share quantity. As illustrated in FIG. 2, System 100 market data messages 200 include the symbol, price range, and color alerts 220, 222, 224, 226, 228 that have unique and intrinsic meaning.

System 100 generates a customized market data stream for a Client, according to the Client's current involvement in, for example, market making or in portfolio management. Some color alerts (White 220, Grey 222, Orange 224) are distributed to all Clients, others (Yellow 226, Green 228) are sent to those Clients that have one or more qualifying open master orders on a particular symbol.

A "White" color alert 220 for a symbol indicates that System 100 currently contains no master orders from Clients for the respective symbol. The White color alert is available for distribution to all Clients.

A "Grey" color alert 222 indicates that System 100 contains at least one master order that is either marked as a passive order (indication of interest but not an active order), or an active order that contains a price that is not currently within the bid/ask range for the symbol. The Grey color alert is available for distribution to all Clients.

The current price of a master order must fall within a prescribed price range for the order to become a candidate for triggering an Orange 224, Yellow 226, or Green 228 market data color alert. Other qualifying conditions apply as follows:

An "Orange" color alert 224 indicates that System 100 contains at least one qualifying master order that has been entered and accepted into the Book for a particular symbol. The Orange Alert is also referred to as "Order Present". An Orange qualifying order is configurable by the administrator of System 100. The Orange qualifying order parameters can be a minimum share size, contra type, destination, etc. The standard configuration for this alert is that the share size is greater than 10,000. The Orange color alert is available for distribution to all Clients. The Orange Alert does not allow a user to discern between bids and offers.

A "Yellow" color alert 226 indicates that qualifying master orders have been entered into the Book while another qualifying master order of the opposite side (Buy/Sell) is already in the Book. Only the System 100 Clients that have entered the Yellow qualifying orders will be sent the yellow color alert messages in place of the Orange Alert on their display. All other clients will still see the Orange Alert.

The Yellow color alert is also referred to as "Contra Present" data alert. A qualifying order is configurable by the administrator of System 100. The qualifying order parameters can be a minimum share size, contra type, destination, etc. The system standard configuration for a "Contra Present" qualifying order to receive a yellow alert is that the share size minimum is greater than or equal to a predetermined number of shares (normally quite large), and its side is opposite (i.e., a buy order and a sell order are in the Book) another Yellow qualifying order. The system standard configuration for a "Contra Present" minimum order size is 10,000 shares. However, the minimum order size is settable to another size by a system administrator.

For example, Client One enters a buy order in symbol XYZ for 10,000 shares at a price pegged to the bid and Client two enters a sell order for symbol XYZ for 20,000 shares at a price pegged to the offer. Both the orders are qualifying as their share sizes exceed the minimum of 10,000 shares, they are opposite sides (contra orders) of a potential transaction (Buy and a Sell) and are both priced within the System 100 price range. Upon the entry and acceptance of a second qualifying order, System 100 would send a yellow alert message to both users.

A "Green" color alert 228 indicates that the Clients receiving the data messages have entered Green qualifying orders into System 100 and another Green qualifying order (of the opposite side Buy/Sell) is already in the Book. A qualifying order is configurable by the administrator of System 100. The qualifying order parameters can be a minimum share size, contra type, destination, etc. Only the System 100 Clients that have entered the Green qualifying orders will be sent the Green color alert. The Green color alert is also referred to as "Super Contra Present" data alert. The system standard configuration for a "Super Contra Present" qualifying order to receive a Green alert is that the share size minimum is greater than or equal to 50,000 shares and its side is opposite (i.e., a buy order and a sell order are in the order book) another Green qualifying. A determination of the presence of a Green qualifying order is made based on the order parameters configured by the system administrator. The parameters themselves can be specified by Clients, or set by the system operator for its own commercial benefit.

As will be understood by a person of ordinary skill in the art, the color scheme is merely a mechanism of how the various order classifications described above are represented to the Clients. Other mechanisms to identify among the various classifications are within the scope of the invention. For example a different iconic symbol may be displayed for each classification.

Figure 3:
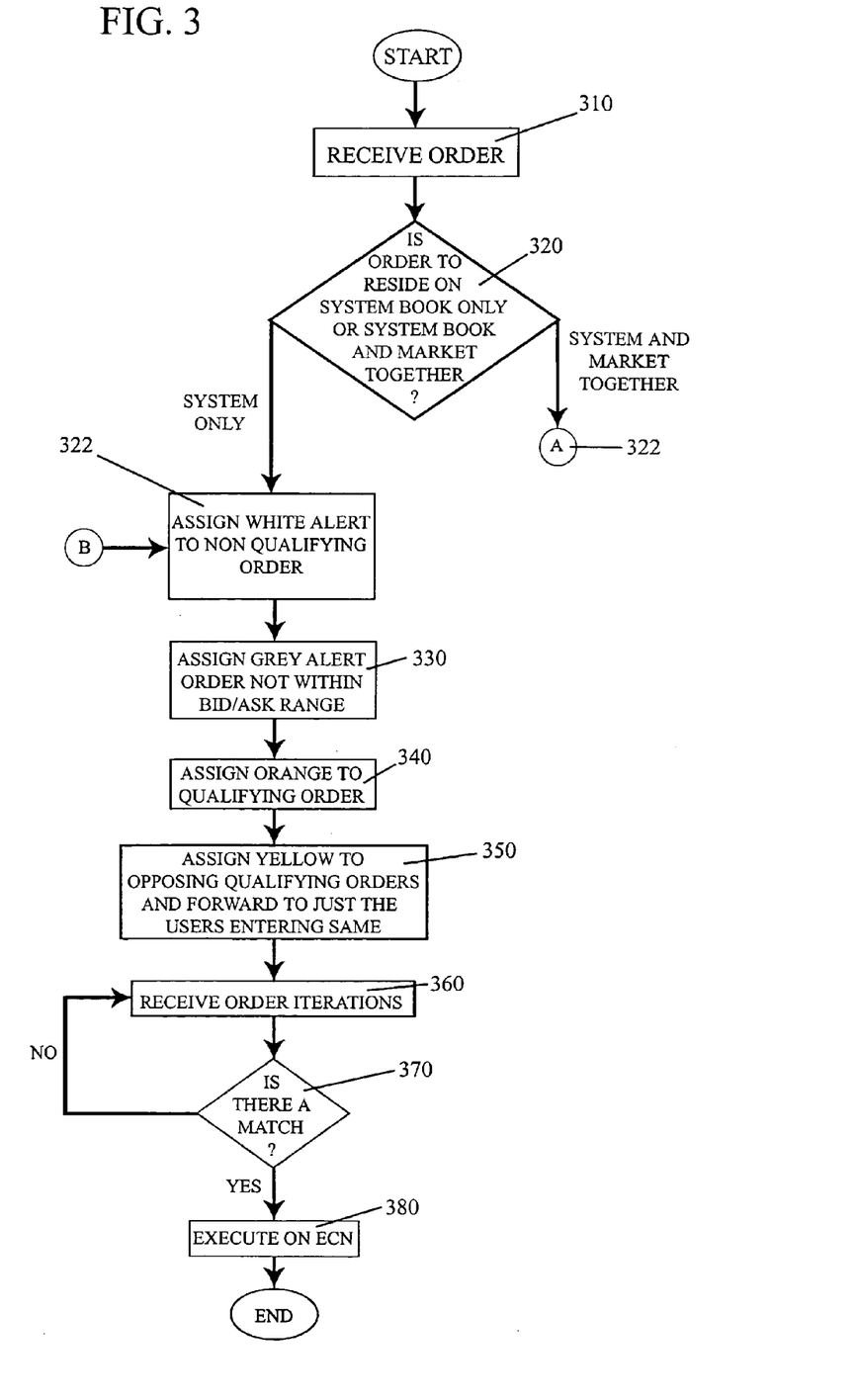
FIG. 3 is a flow diagram of a process for one embodiment of certain aspects of the present invention.

FIG. 3 is flow diagram illustrating steps of process 300 which generates a customized market data stream. At step 310, System 100 receives an order as data input to the system. The order is received over the communication network 10 from a Client 30. Attributes for the order are entered by the user who interfaces through an interactive GUI with the client software or API. The qualifying order parameters configured by the system administrator are rules that are used by System 100 to evaluate and determine the status of the user's order. Applying these rules, System 100, step 320, determines if the order is a system-only order, or a System and Marketplace order. If the order is a System and Marketplace order, the process continues to process 400, at step 322. For system-only orders, step 322, a white alert is assigned to symbols representing equity that has no master orders placed on the system. A grey alert, step 330, is assigned to orders that are not within the system bid/ask range and otherwise do not meet the qualifying parameters of the system. Qualifying orders without a matching order receive an orange alert, step 340. White, grey, and orange alerts are pushed by the System 100 to all users and are indicated in the display screen of FIG. 2. At step 350, a yellow alert is assigned to opposing qualifying orders. The yellow alert market data is provided by System 100 to only those users whose order has been graded with a yellow alert. At step 360, the System receives iterations of the yellow alert orders. At this stage the users are adjusting their orders to create a matching condition. If a match is not created, step 370, the system continues to provide orange alerts. If a match is created by the latest iteration, the matching contra orders are sent to an ECN for execution.

The behavior proprietary attribute is be defined for all master orders before submitting the order to System 100. This attribute qualifies an order as either "System 100-only" or "System 100 and Market." The Server 110 never creates child orders for a "System 100-only" master order until the master order is determined to have one or more matching orders on the opposite side of the trade. This determination is made based on the qualifying order configurations discussed above. As soon as such master order is in a cross condition with another order, the Server generates child orders for two or more master orders that participate in the cross, and sends the child orders out to an away market (an ECN) for execution in the time-priority sequence. Passive master orders are implicitly "System 100-only," because these orders are preferably presented to indicate interest and are not for execution in this form.

The Server 110 treats a "System 100 and Market" master order differently in that it sends a portion of the order's liquidity in the form of a child order to an away market ECN as soon as the order is accepted into the Book. No expiration timeout is set for the respective child order, and its size is determined by the value of the Maximum Away Market Exposure Size proprietary attribute, described below. Master orders with destination market set to algorithmic platforms are implicitly "System 100 and Market."

The Server preferably sets child orders generated as a result of a found match to automatically expire within a short time after being sent to an away market for execution. The expiration can be set as an order attribute within the child order readable by the away market, or by sending a cancellation order to the away market after the predetermined time. To ensure compliance with Reg. NMS, only stock exchanges and ECNs can act as away markets. Therefore, execution of the child order may result in extensive global equities market sweep, leading to price improvement on one side of the trade and only partial execution on the other side. The child orders are scheduled for only brief exposure to the away market so that unexecuted liquidity can be merged back into the Book and become available for the next match scan in timely manner.

To maintain the time/priority of orders, system 100 sends opposing matched contra orders to the ECN in the order that they were received in the system 100. A price improvement can result to the benefit of one side of the crossed order. For example, Client One enters to buy 10,000 shares of IBM and Client Two enters as a seller of 10,000 shares of IBM. System 100 will match Client One with Client Two for the 10,000 shares. However if 100 shares is sitting on the ECN marketplace offered for sale at a lower price than Client Two's offer, Client One and Client Two do cross but can only match 9,900 shares. Client One would get the first 100 shares from the marketplace offer. Thus, the industry practice of trade-through is avoided, and all market participants have an opportunity in the transaction.

The Maximum Away Market Exposure Size (i.e., how large a child order automatically generated for a "System 100 and Market" master order under no-cross conditions is allowed to be) is controlled by the optional Maximum Away Market Exposure Size master order attribute, also referred to as Max Floor size. System 100 keeps track of the remaining number of shares being exposed to the away market as the child order gets filled because of being crossed with other orders at the away market. As soon as that number has fallen below a certain threshold, System 100 automatically replenishes the exposed liquidity at the expense of the master order liquidity still on the Book by canceling the remainder of the child order and replacing it with a new, larger child order. "System 100 and Market" child order automatic replenishment continues as long as there remains sufficient master order liquidity on the Book. However, share quantity of such child orders never exceeds the limitation set by the Maximum Away Market Exposure Size attribute. In a further embodiment, when this attribute is omitted the automatically generated child order includes all shares of the original master order.

A Client's interaction with System 100 is regulated according to the set of roles associated with the Client's login, and thus Client participation in System 100 is role-based. The Server 110 accepts orders from Clients that are allowed to act as "Natural" or "Liquidity Provider" market participants.

The System 100 proprietary Acceptable Contra Parties attribute can be used to restrict market order participation in cross searches to specific types of contra parties. If a Client enters a new master order qualified with the Acceptable Contra Parties attribute as allowing crosses only with System 100 "Liquidity Provider" participants, the Server will attempt to match the order only with orders submitted by Clients that are assigned the Liquidity Provider role. When the Client omits this attribute, the Server can attempt to cross the order with all orders on the opposite side of the trade.

System 100 defines one special value for this attribute: "No Acceptable Contras." This value effectively prevents the Server from ever crossing the order with any other. Such an order is considered passive and regarded as an indication of interest, not as trade intent. System 100 advertises presence of passive orders in the Book by broadcasting a Grey color alert.

Liquidity attached to child orders, that are created to satisfy a particular cross (i.e. cross-specific child orders), is considered locked at the away market ECN and unavailable for further crosses. Such child orders either execute immediately or eventually time out. In the latter case their residual liquidity merges back into their respective master orders in the Book, their liquidity being no longer locked-out it again becomes available for crosses.

Non-cross-specific child orders are those that the Server creates for all new "System 100 and Market" master orders regardless of whether there are matching contra orders in the Book. Liquidity attached to such child orders is not considered locked at the away market, since it was not expected to cross immediately when the orders were being sent there. In some cases this liquidity can be used more efficiently if reassigned to other, cross-specific, child orders and sent to another away market for immediate execution. In order to reallocate liquidity between child orders the Server must withdraw the liquidity from the away markets by canceling the original child orders, waiting for the liquidity to return, merging the liquidity back into the Book, and then assigning the liquidity to new child orders. The determination of when liquidity has returned includes an assessment of the open orders for that security as compared to established criteria (e.g., order size, trade volume, and order numbers).

However, under certain circumstances liquidity withdrawals may be undesirable, as when a master order's destination is an algorithmic platform. The Subject for Cancellation flag regulates whether or not the Server is allowed to cancel non-cross-specific child orders from away markets to satisfy a newly detected cross condition.

"System 100 and Market" master orders, that are marked by the System 100 proprietary Subject for Cancellation Flag, may have their non-cross-specific child orders canceled by the Server when liquidity distribution on one side of the Book is such that there would be a potential for additional matches if there were more free liquidity available on the other side of the Book. When the Client omits this flag, the Server will never attempt to cancel the non-cross-specific child orders. Thus, the system tests for this flag to implement the cancellations.

In System 100, third-party algorithmic platforms can play the role of away markets. However, the Server never uses algorithmic destinations for execution of child orders that are created as a result of a cross in the Book. Instead, if a participant wants System 100 to route its order to an algorithmic platform, the order must include the platform's identifier in its destination field. In addition platform-specific order parameters must be enclosed with the order message as an attachment. The exact format of the parameter attachment depends on the data protocol or API being used by the Client.

Liquidity sent to an algorithmic platform may be temporarily moved to another non-algorithmic market unless the Client has explicitly prohibited liquidity reallocation.

Upon acceptance of a new master order into the Book, System 100 periodically checks to see if the newly accepted order can match or cross with any existing orders(s) contained in the Book for a particular symbol. For an order on the buy side System 100 checks if its price (contained in the order data) is greater or equal to any previously accepted active sell order(s). Conversely, for a sell side order System 100 checks if its price (again, contained in the order data) is less than or equal to any previously accepted and active buy order(s). System 100 also ensures that the potential trades qualify to match based on System 100 master order proprietary attributes such as acceptable contra parties.

When a match (or a cross) occurs System 100 creates appropriate child orders and sends them to an away market in time sequence. For cross-related child orders any approved stock exchange or ECN can be used as the away market. A child order for every affected master order is sent to the away market first, followed by a child order for every initiating master order. This maintains the price-time priority for orders on the Book. The initiating master order(s) is eligible for receiving the price improvement coming from the affected master order(s). In addition all orders are eligible for additional price improvement from any better priced orders on the away market book.

By way of example, Client One enters an order to buy shares at a price of $28.00. If a contra order exists, or is placed, that offers for $28.00 or less a match is made by system 100. To execute the order on an ECN, system 100 sends a display size order to the ECN. A display size order is the smallest size order that will be displayed on the ECN. The earlier of the buy order or the sell order is sent to the ECN by system 100. This order arrives and interacts with any existing matching orders on the ECN. A small fraction of time later system 100 sends the contra order, followed by the remaining portion of the earlier order. In this manner the price improvement goes to the Client which entered the second of the matching orders. The process described above makes System 100 Regulation NMS-compliant and suitable for wide commercial distribution as well as for licensing to firms for internal use to comply with the Regulation NMS requirements.

When the available unlocked liquidity on the Book is exhausted System 100 determines if additional matches would be possible from "System 100 and Market" master orders with non-cross-related child orders that the Client has flagged as subject for cancellation due to potential for further crosses. If System 100 does see a possibility for further crosses, it attempts to cancel the eligible non-cross-related child orders. Residual liquidity on the canceled child orders then merges into their respective master orders in the Book and becomes available for another iteration of the cross search.

The following is an example of one embodiment that accomplishes execution of system and market orders.

System 100 scans its book entries for a particular symbol every time an event related to the symbol occurs. Any type of event (message from market data server, from traders, from ECNs (away markets), etc.) has a potential to trigger an action. These messages can contain different information depending on their source. For instance, messages from market data server(s) can include bid and/or offer price updates, which has an affect on the pegged master orders. Messages from traders, have a direct affect on master orders and implicate new order initiation, order cancellation, and order replacement. Messages from away markets (ECNs) relate to child orders, which can have an indirect affect on master order (parent) liquidity and availability. ECN messages can include (partial or complete) order fill, order rejection, order cancel confirmation, or order cancel rejection.

At any given moment in time, liquidity can be distributed between the System 100 book (master orders) and one or more away markets (child orders). Each system and market master order can be either recallable or non-recallable via an attribute setting in its order data. In addition each system and market master order can be assigned an optional maximum floor size limiting its exposure to the away markets.

Optionally, initiating orders can be marked as Immediate or Cancel ("IOC") orders (i.e., any portion of the order not executed substantially immediately after it becomes available on the market is to be cancelled via another attribute setting that is populated based on user selections through the client interface. Further, or in combination with the prior indications, before reaching their final destination, initiating orders can be marked "Reg. NMS Complaint." Under Reg. NMS, every destination (e.g., an ECN) can label an order to indicate that it was market swept before entering that final destination's book.

System 100 is operable to check the top of the book on every market place before trading-through on the last destination marketplace. This is possible where the individual market places are interacting in an electronic auto execution environment.

System 100 employs numerous strategies to maximize the benefit to its users. On the most basic level System 100 can compare the NBBO price as well as the individual books of all market places. To achieve Reg. NMS compliance, System 100 conducts a market sweep with one or more of the orders placed on the System 100 book that is involved in a match. For example. if there is a Seller offering shares at $50 and a buyer enters a $50 buy order for the same stock a match has occurred. In this example, if the NBBO is $49.98, the match is therefore 2 cents through-the-market. System 100, at this point, sends out the buy order to electronic market places available to participate in the trade. This system buy order can result in achieving price improvement, while at the same time complying with Reg. NMS. System 100's smart routing and analysis of the current state of the market results in the best price conditions and fastest path to fulfill the need. Once all eligible market places have interacted with the buy order, the match will occur with the original sell order at whatever destination System 100 deems fit.

Under the previous example, the aggressor receives the price improvement, as is the industry norm. However, System 100 is more robust that this and is not so limited. Therefore, the inverse can occur as well, where System 100 is configured to give the price improvement to either the buyer or the seller—regardless of which is the aggressor.

An exemplar algorithm uses liquidity efficiently while minimizing unnecessary liquidity redistributions and preventing execution race conditions and deadlocks. For example, assume four traders enter orders on MSFT. Trader T1 enters a system-only order to sell 10,000 of MSFT at $10.01. In response System 100 creates a new master order M1 on its book. Trader T2 enters a system and market order to sell 40,000 of MSFT at $10.02 with 10,000 maximum floor recallable. System 100 creates a new master order M2 (40,000) and a child order C21 (10,000) at an ECN. Trader T3 enters a system and market order to sell 50,000 of MSFT at $10.03 no max floor non-recallable. The System 100 creates a new master order M3 (50,000) and a child order C31 (50,000) at an ECN. Trader T4 enters a system and market order to sell 20,000 of MSFT at $10.01 with no maximum floor recallable. In response, System 100 creates a new master order M4 (20,000) and a child order C41 (20,000) at an ECN.

With all four orders entered on System 100, the total immediately available liquidity on the system book is short 10,000 at $10.01 (M1), short 30,000 (40,000–10,000) at $10.02 (M2) which is a total of 40,000 shares short. Subsequent, trader T5 enters a system-only order to buy 80,000 of MSFT at $10.05. System 100 creates a new master order M5 on its book.

Because there is now contra crossing orders, the processing of M5 begins as follows:

Step 1) System 100 immediately matches M5 with M1, M2, M3 and M4. Of the 80,000 of M5 40,000 can be matched against the 10,000 of M1 and the residual 30,000 of M2. Therefore, System 100 creates a child order C11 for M1 to sell 10,000. From M2, system 100 creates another child order C22 for M2 to sell 30,000. System 100 also creates child order C51 for M5 to buy 40,000. Finally, System 100 sends these new child orders to the ECN in the following sequence: C11, C22, C51. These child orders are cross-related, because they have been triggered by a match condition.

Cross-related child orders cannot be recalled from the away market even though they may belong to recallable master orders (as C22 is). Instead system 100 sets up a timer (e.g., 2 seconds). System 100 will cancel the child orders, if still alive, as soon as the timer elapses. Here, system 100 has been unable to match the remaining 40,000 of M2 because it ran out of immediately available liquidity on its book.

Step 2) Processing of M5 continues as soon as the next MSFT-related event is detected. The next event is likely to be caused by an ECN reacting to the new order requests, for example by sending back an "order accepted" message for C11. However, it is irrelevant to the invention as to what triggers the next MSFT-related event in the System 100. The event need only happen shortly after sending C11 out, or even before that in cases where System 100 receives frequent MSFT market data updates.

System 100 senses a deficit of available short liquidity and seeks out recallable liquidity belonging to either M1, M2, M3 or M4. Because of the price-time priority rule, System 100 begins the search with M1, then goes to M4, then to M2 and ends with M3. M1 has been exhausted in Step 1. M4 has 20,000 shares in C41. Those shares are recallable. Therefore, System 100 sends a message to the ECN to cancel C41.

Step 3) System 100 still has 40,000 of M5 to match. On the next event (for example triggered by an acceptance message of C22 by the ECN), System 100 initiates another search. M1 is still found to be exhausted. M4 has 20,000 shares in C41, but C41 is already being canceled (no corresponding "cancel accepted" message has been received yet). Water stops the search. This has been a dry run.

Step 4) System 100 receives a "cancel accepted" for C41. This message triggers a new book scan. C41 no longer exists. All of its shares are now considered merged back into the system book and immediately available for cross. System 100 creates a 20,000-share child order, C42, for M4 and a 20,000-share child order, C52, for M5. System 100 then sends C42 to the ECN, followed by C52. Child orders C42 and C52 are cross-related and have a short (e.g., 2 second) life span.

At this point 20,000 of M5 are still remaining.

Step 5) On the next iteration of the search, System 100 finds M1 and M4 exhausted. Of M2, C22 is cross-related and therefore non-recallable, but C21 is non-cross-related and belongs to the recallable M2. The system 100 sends a message to the ECN to cancel C21.

Step 6) On this iteration System 100 senses C21, but C21 is already being canceled. Thus, this iteration is a dry run.

Step 7) The child order C21 has been canceled. System 100 creates a 10,000-share child order C23 (M2) and a 10,000-share C53 (M3). The system 100 sends out C23 to the ECN, followed by C53.

Now 10,000 of M5 remain unmatched.

Step 8) M1, M4 and M2 are now exhausted, and M3 is non-recallable. There is no matching short liquidity found to satisfy the remaining 10,000 of M5.

In the perfect world 70,000 of M5 crosses with 10,000 of M1 (C11), 40,000 of M2 (C22, C23) and 20,000 of M4 (C42). Canceling C41 and C21 pays off. However, in reality there are too many outside interferences that could affect the process.

One such interference could be the existing of interfering non-system liquidity present on the market. By the time C11 reaches the away market there may be a non-system buy order F1 for 30,000 MSFT at $10.01 that has already matched with C41 and executed. But, 10,000 shares of F1 are still pending. Those 10,000 fill C11 immediately, so that C51 will have a chance to get filled only by C22 (30,000 shares). Under such circumstances, the system 100 search results will be as follows:

Step 1a: C11 (10,000, filled by F1), C22 (30,000), C51 (40,000)

Step 2a: cancel C21, C51 still waiting to be withdrawn by timeout

Step 3a: C23 (10,000, filled by remainder of C51), C52 (10,000)

Step 4a: C52 withdrawn by timeout

Total 40,000 of M5 filled

Another challenge can arise in attempting to recall a non-existing child order. Assuming absence of any qualifying non-system order on the away market's book, the first order M51 gets filled from may actually be C41. It is impossible to predict if the cancel request message sent at Step 2 to cancel C41 will reach the away market before or after that happens. Thus, a number of outcomes are possible:

1b: Step 2 completes and the cancel request reaches the away market before C41 has a chance to partially fill C51. The away market accepts the cancel request and cancels C41 thus preventing C41 from filling C51. System 100 receives "cancel pending" and "order canceled" messages back. This outcome is the one assumed for the main discussion of the algorithm.

2b: A ECN specific occurrence can happen. The cancel request reaches the ECN before C41 has a chance to partially fill C51. The ECN accepts the cancel request and sends a "cancel pending" message back. However, before the ECN removes C41 from its book C41 partially fills C51 and disappears on its own. System 100 receives a "fill" message, and the ECN's attempt to cancel C41 fails. Now System 100 also receives a "cancel reject" message.

3b: The cancel request reaches the away market after C41 partially filled C51. This outcome is possible because the fill message may reach System 100 when it has already sent the cancel request. Thus, System 100 receives a "cancel reject" message.

Figure 4:
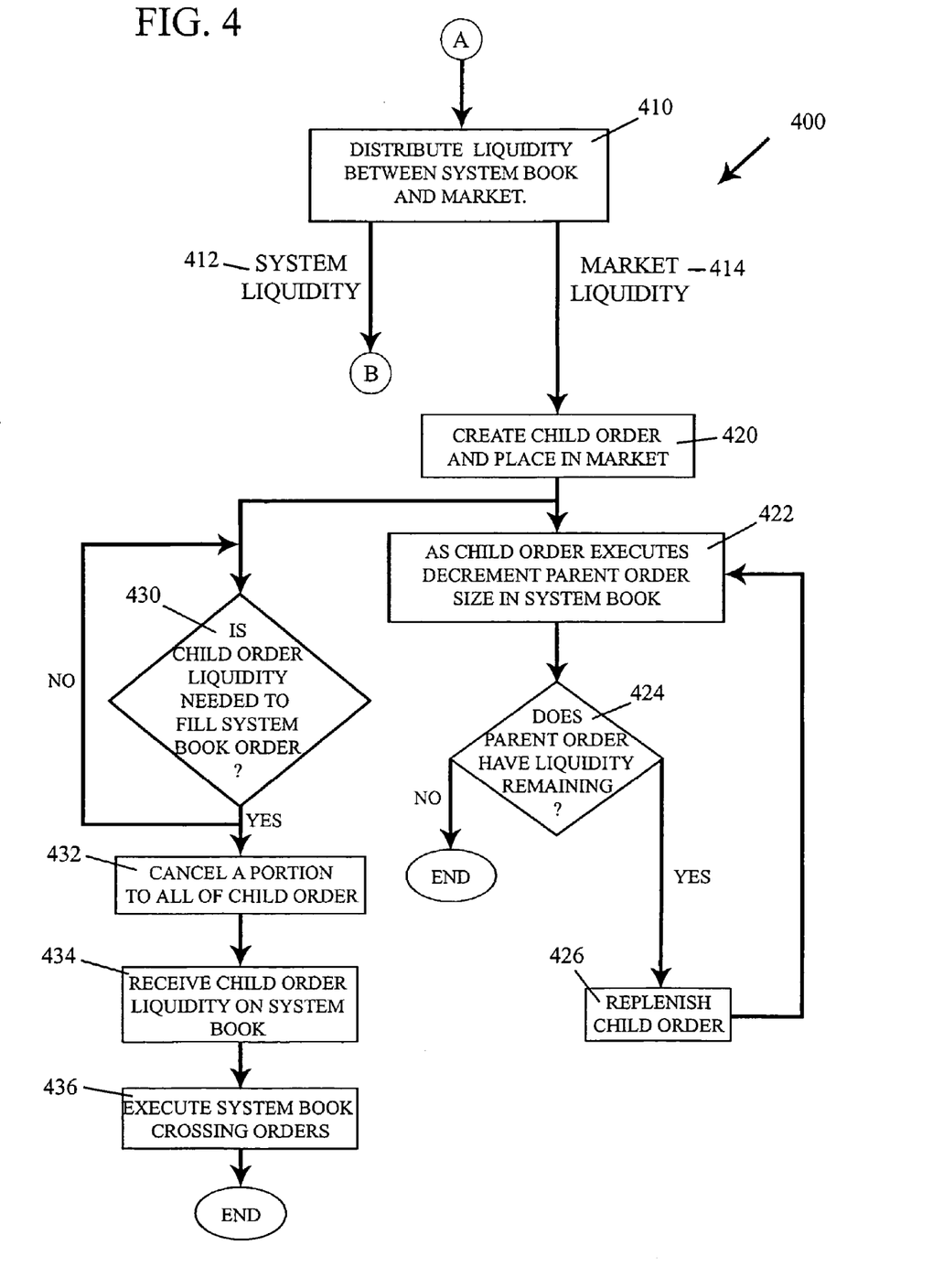
FIG. 4 is a flow diagram for another process in accordance with another process embodying aspects of the invention.

FIG. 4 is flow diagram illustrating steps of process 400 which distributes liquidity between the system book and the ECN market. At step 412, that portion of an order that is to be system liquidity is handled in accordance with process 300, as described above. At step 420, system 100 creates a child order and places it on the ECN for execution. As the child order executes on the ECN, step 422, the parent liquidity on the system book is decremented. At all times system 100 tracks the total availability of the master order. In this manner available liquidity for the system book and the child market orders is known by the system 100. At step 424, the parent liquidity on the system book is checked for available liquidity (e.g., by deducting the child order liquidity and crossed orders from the original liquidity of the master order. If there is liquidity, step 426, the child order on the ECN is replenished. Execution of the child order, step 424 and replenishment continues until, step 424, there is no more available liquidity.

As steps 422-426 are occurring, step 430 determines if the child liquidity is needed so that the parent order on the system book can be crossed with other system orders. If the child liquidity is needed, step 432, a cancel message is sent to the ECN. This cancel message can be for a portion or all liquidity in the child order. The child liquidity is received back, step 434, on the system book. At step 436 the System 100 executes the system crossed orders.

System 100 enables real-time direct anonymous negotiation between individual trading participants. Usually the subject of a negotiation is a pair of master orders on the opposite trade sides. The Client-owners of the two orders may enter a direct and secure negotiation session concerning certain parameters of the orders, whereby one of the Clients sends an electronic negotiation ticket offering a proposal to the other Client. The negotiation has a proposal which includes a subset of predetermined value fields. The electronic ticket supports such fields as order share quantity, price and proposal expiration time. As soon as the addressee Client receives the ticket, it can reject the proposal and thereby end the negotiation session, send a counter-proposal back to the first Client, or accept the proposal. Proposals and counter-proposals can be withdrawn by the issuing party. Proposal and counter-proposals can also expire if it takes the answering party too long to respond in accordance with the optional timeout parameter on the negotiation ticket. When a Client accepts the proposal, System 100 automatically alters the Client's master order that is the subject of the negotiation so that it corresponds to the new agreed upon conditions. Thus, the proposal process is an alternative mechanism to defined the contents of the master order to be traded.

The System 100 system accepts orders via front end software and electronic API that may be forwarded to third party algorithmic order servers. These orders, upon entry to the System 100 system, contain additional System 100 specific "order instructions" that allow the order to interact with existing orders residing on the System 100 order book. Upon entry to the System 100 system, algorithmic orders that are routed to third party servers may contain additional order instructions that modify the order sent to the third party order server in order for the order to interact with orders that are entered into System 100 at a time after the original order was routed to the third party algorithmic server.

The System 100 System accepts orders that have the option of residing in the System 100 hidden order book as well as being routed to one or more exchange or ECN. The user has the ability to select what portion (share size) or percentage of the original order that is routed to an external market for execution. The system also can replenish orders that have been executed by an external exchange or ECN according to user settings and parameters.

The System 100 System, in real time, determines if any two or more orders within the book are eligible to match. It is this matching which forms the basis of the color alerts described above. When a match (or a cross) occurs the system routes the appropriate orders to an ECN in time sequence. The order that initiated the match or cross on the System 100 system is routed to the ECN (or exchange) a few milliseconds after the affected order. This maintains the price/time priority for orders on the System 100 book. The initiating order on the System 100 receives the price improvement relating to the non-initiating order from the System 100 book.

In addition, orders sent from the System 100 book resulting from a cross receives any additional available price improvement from any better priced orders residing on the exchange or ECN that the System 100 system routes its matched order to. The initiating order, if priced at a price higher (for buy orders) that the national best offer or priced lower (for sell orders) than the national best bid, sweeps these better priced orders. This process provides price improvement to System 100 matches as well complies with the recently passed Reg. NMS.

The System 100 accepts orders from multiple types of participants. The "type" of market participant is determined by a "flag" within the order and via a series of system checks by the System 100 System. The system currently accepts orders from two types of system defined users, "liquidity providers" and "naturals."

Users may select as an order entry option which type of orders they desire to interact with. If a user order limits their order participation, their respective orders only match or cross with their predetermined criteria.

Under certain qualifying conditions regarding an order, users have the ability to send an "electronic" negotiation ticket to the user of another order. This electronic ticket has predetermined fields that are sent electronically to the other user. If the user accepts the fields, the trade is automatically resubmitted into the System 100 system with the new parameters. The qualifying conditions can be a minimum user defined (or fixed) size of the other potential matching order. The negotiation ticket can include price, size, other conditions (such as "all or none") and time to respond.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A system for performing crossing of institutional security orders comprising:
a first server connected across a communication network to at least one second server providing an away market for order execution and to a plurality of client stations;
each client station having an interface configured to input orders into an order book maintained by the first server;

the first server including a database, and configured to receive at least first and second institutional orders, wherein the first and second institutional orders are stored in the database, wherein the first and second institutional orders are contra orders;

the first server further including operating instructions operable to determine whether matching terms exist between the first and second institutional orders, wherein the matching terms determination is based on predetermined criteria;

the operating instructions, upon determination of matching terms, being further operable to instruct the first server to forward, to the at least one second server, contra orders composed of at least respective portions of the first and second institutional orders for execution on the at least one second server in lieu of the first server in a time-priority sequence relative to any orders in the away market so as to provide additional orders to the away market, wherein a plurality of participants in the away market have an opportunity to execute a transaction with at least one of the contra orders; and the operating instructions being further operable to set an automatic expiration attribute for at least one of the contra orders so as to limit an exposure on the away market.

2. The system of claim 1, wherein the predetermined criteria includes at least one of order size, price, order type, and institutional attributes.

3. The system of claim 1, wherein the operating instructions are further operable to enable real-time anonymous negotiation between individual trading partners.

4. The system of claim 3, wherein the negotiation includes an electronic negotiation ticket sent on the communication network, wherein the negotiation ticket contains a proposal having a subset of predetermined value fields.

5. The system of claim 4, wherein the negotiation ticket includes an expiration field.

6. The system of claim 3, wherein upon acceptance of the negotiation by the individual trading partners the institutional orders are updated.

7. The system of claim 1, wherein one of the contra orders receives a price improvement in relation to the other contra order.

8. A computer-implemented method for performing crossing of institutional orders on a computer system having a first server, a second server which is an away market, and a plurality of client stations connected in a distributed manner across a communication network, comprising the programmatically executed steps of:

receiving, at the first server, at least first and second contra institutional orders from at least two respective client stations;

storing the first and second contra institutional orders in a database connected to the first server;

determining, based on predetermined criteria, whether matching terms exist between the contra institutional orders;

transmitting, across the network to the second server that is the away market, contra orders composed of at least respective portions of the contra institutional orders having matching terms for execution on the second server in lieu of the first server in a time-priority sequence relative to any orders in the away market of the second server so as to provide additional orders to the away market, wherein a plurality of participants in the away market have an opportunity to execute a transaction with at least one of the contra orders; and setting an automatic expiration attribute for at least one of the contra orders so as to limit an exposure on the away market.

9. The method of claim 8, further including the step of enabling real-time anonymous negotiation between individual trading partners, wherein an electronic negotiation ticket is sent among the trading partners.

10. The method of claim 9, wherein the negotiation ticket includes a proposal having a subset of predetermined values.

11. The method of claim 9, wherein upon acceptance of the negotiation by the trading partners, the method further including the step of updating the institutional orders.

12. The method of claim 8, further including the step of receiving a price improvement to one of the contra orders.

13. A system for performing crossing of institutional security orders comprising:

a first server connected across a communication network to at least one second server providing an away market for order execution and to a plurality of client stations;

each client station having an interface configured to input orders into an order book maintained by the first server, including any qualifying order for a particular equity, wherein the interface is further configured to provide a limited display of information in accordance with a classification, wherein the classification identifies at a first client station an Order Present for the particular equity, the Order Present being free of information sufficient to discern whether any qualifying order input at any of the remaining client stations is a bid or an offer; and wherein the classification selectively identifies at the first client station a Contra Present only when a qualifying order input at the first client station for the particular equity remains in the order book of the first server and when there is a qualifying order that is contra to the Order Present;

the first server including a database, and configured to receive at least first and second institutional orders and generate a customized market data stream for each said client station that identifies any qualifying order at the first client station in accordance with the classification, wherein the first and second institutional orders are stored in the database, wherein the first and second institutional orders are contra orders;

the first server further including operating instructions operable to determine whether matching terms exist between the first and second institutional orders, wherein the matching terms determination is based on predetermined criteria;

the operating instructions, upon determination of matching terms, being further operable to instruct the first server to forward, to the at least one second server, contra orders composed of at least respective portions of the first and second institutional orders for execution on the at least one second server in lieu of the first server in a time-priority sequence relative to any orders in the away market so as to provide additional orders to the away market, wherein a plurality of participants in the away market have an opportunity to execute a transaction with at least one of the contra orders; and the operating instructions being further operable to set an automatic expiration attribute for at least one of the contra orders so as to limit an exposure on the away market.

* * * * *